(12) United States Patent
Ozeki

(10) Patent No.: US 10,991,167 B2
(45) Date of Patent: Apr. 27, 2021

(54) INFORMATION PROCESSING SYSTEM, AND NON-TRANSITORY COMPUTER READABLE MEDIUM STORING PROGRAM

(71) Applicant: FUJI XEROX CO., LTD., Tokyo (JP)

(72) Inventor: Kazunori Ozeki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/748,829

(22) Filed: Jan. 22, 2020

(65) Prior Publication Data

US 2021/0090355 A1 Mar. 25, 2021

(30) Foreign Application Priority Data

Sep. 19, 2019 (JP) .............................. JP2019-170853

(51) Int. Cl.
*G07C 1/10* (2006.01)
*G07C 9/00* (2020.01)
*G06Q 10/02* (2012.01)

(52) U.S. Cl.
CPC ............... *G07C 1/10* (2013.01); *G06Q 10/02* (2013.01); *G07C 9/00* (2013.01); *G07C 2209/08* (2013.01)

(58) Field of Classification Search
CPC ........ G07C 1/10; G07C 9/00; G07C 2209/08; G06Q 10/02

USPC ........................................................ 340/573.1
See application file for complete search history.

(56) References Cited

U.S. PATENT DOCUMENTS

| | | | | |
|---|---|---|---|---|
| 2006/0015376 A1* | 1/2006 | Sattler | .................... | G06Q 10/06 705/5 |
| 2006/0015491 A1* | 1/2006 | Lee | ........................ | G06Q 10/02 |
| 2006/0020481 A1* | 1/2006 | Lee | ........................ | G06Q 10/02 705/5 |
| 2006/0020515 A1* | 1/2006 | Lee | ....................... | G06Q 20/203 705/22 |
| 2006/0031105 A1* | 2/2006 | Lee | ........................ | G06Q 10/10 705/5 |

FOREIGN PATENT DOCUMENTS

| | | |
|---|---|---|
| JP | 2002056323 | 2/2002 |
| JP | 2004086582 | 3/2004 |
| JP | 5108831 | 12/2012 |

* cited by examiner

*Primary Examiner* — John A Tweel, Jr.
(74) *Attorney, Agent, or Firm* — JCIPRNET

(57) ABSTRACT

An information processing system includes: an identification unit that identifies a condition for use of a work site according to a purpose of visit of a visitor; and a presentation unit that presents candidates for the work site which satisfy the condition for use identified by the identification unit.

12 Claims, 10 Drawing Sheets

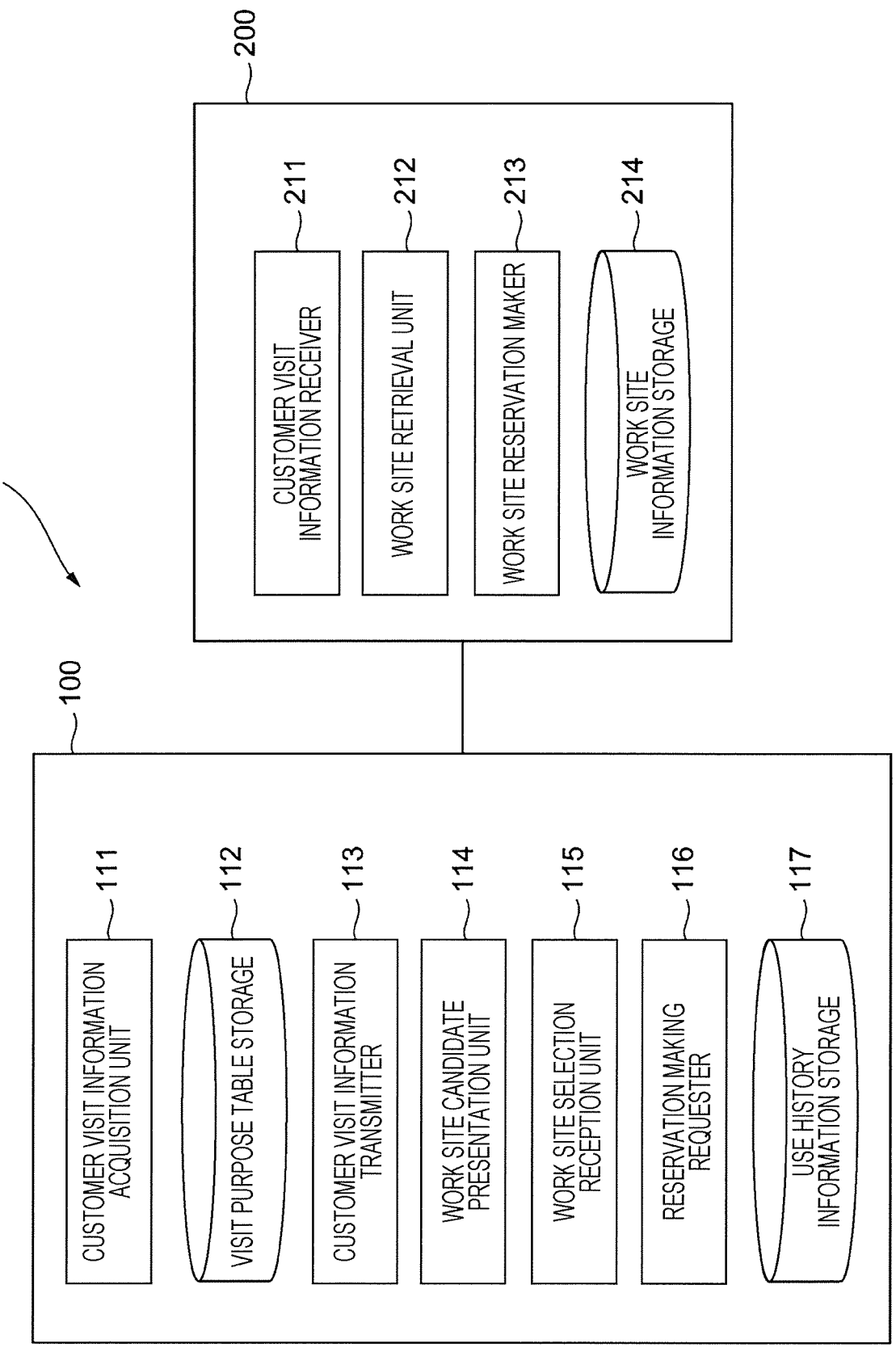

FIG. 4A

| PURPOSE OF VISIT | NECESSITY/UNNECESSITY OF USE OF WORK SITE AND USE TIMING | REQUIRED SECURITY LEVEL OF WORK SITE | WORK TIME |
|---|---|---|---|
| PRODUCT EXPLANATION | PRE-VISIT USE | MEDIUM | 30 MINUTES |
| CUSTOMER SURVEY | POST-VISIT USE | MEDIUM | 1 HOUR |
| PROPOSAL | PRE-VISIT USE | HIGH | 1 HOUR |
| ESTIMATE | PRE-VISIT USE | LOW | 30 MINUTES |
| CONTRACT | POST-VISIT USE | HIGH | 1 HOUR |
| PRODUCT DELIVERY | POST-VISIT USE | MEDIUM | 30 MINUTES |
| REGULAR VISIT | UNNECESSARY | | |

FIG. 4B

| SECURITY LEVEL | CONFIGURATION OF WORK SPACE |
|---|---|
| HIGH | INDIVIDUAL SPACE |
| MEDIUM | WALL ON THE BACK, DISTANCE TO ADJACENT SITE IS AT LEAST 3 m |
| LOW | DISTANCE TO ADJACENT SITE IS LESS THAN 3 m |

FIG. 8A

DATE/TIME OF START OF VISIT
13:00 ON APRIL 1 2019

DATE/TIME OF END OF VISIT
15:00 ON APRIL 1 2019

PURPOSE OF VISIT
▽

THE NUMBER OF ATTENDANCES
1

ATTENDANCE NAME
AAA

NAME OF VISIT DESTINATION
BBB CORPORATION

ADDRESS OF VISIT DESTINATION
CCC, MINATO-KU, TOKYO

PERSON IN CHARGE OF VISIT DESTINATION
DDD

[REGISTER] [CANCEL]

DATE/TIME OF START OF VISIT
13:00 ON APRIL 1 2019

DATE/TIME OF END OF VISIT
15:00 ON APRIL 1 2019

PURPOSE OF VISIT
▽

PRODUCT EXPLANATION
CUSTOMER SURVEY
PROPOSAL
ESTIMATE
CONTRACT
PRODUCT DELIVERY
REGULAR VISIT

ADDRESS OF VISIT DESTINATION
CCC, MINATO-KU, TOKYO

PERSON IN CHARGE OF VISIT DESTINATION
DDD

[REGISTER] [CANCEL]

FIG. 9

CONDITIONS

USE TIMING OF WORK SITE

DATE/TIME OF START OF VISIT

DATE/TIME OF END OF VISIT

WORK TIME AT WORK SITE

ADDRESS OF VISIT DESTINATION

THE NUMBER OF ATTENDANCES

SECURITY LEVEL

RETRIEVE AGAIN

THE WORK SITES IN MATCHED CONDITIONS ARE AS FOLLOWS:

| SELECTION | LIST OF WORK SITES | ID |
|---|---|---|
| ☐ | AA STATION, SATELLITE OFFICE NO. 3 ADDRESS: XXX, MINATO-KU, TOKYO SECURITY LEVEL: HIGH | 0003 |
| ☐ | AA STATION, SATELLITE OFFICE NO. 5 ADDRESS: YYY, MINATO-KU, TOKYO SECURITY LEVEL: HIGH | 0005 |
| ✓ | BB BUILDING 10F, SHARE OFFICE 105 ADDRESS: ZZZ, MINATO-KU, TOKYO SECURITY LEVEL: HIGH | 1105 |
| ☐ | CC BUILDING 7F, SHARE SPACE #1 ADDRESS: XYZ, MINATO-KU, TOKYO SECURITY LEVEL: MEDIUM | 2001 |

PLEASE SELECT WORK SITE, AND PRESS RESERVATION BUTTON

RESERVATION — 13

CANCEL — 14

THE WORK SITES IN MATCHED CONDITIONS ARE AS FOLLOWS:

| SELECTION | LIST OF WORK SITES | ID |
|---|---|---|
| ☐ | AA STATION, SATELLITE OFFICE NO. 3<br>ADDRESS: XXX, MINATO-KU, TOKYO<br>SECURITY LEVEL: HIGH | 0003 |
| ☐ | AA STATION, SATELLITE OFFICE NO. 5<br>ADDRESS: YYY, MINATO-KU, TOKYO<br>SECURITY LEVEL: HIGH | 0005 |
| ☐ | BB BUILDING 10F, SHARE OFFICE 105<br>ADDRESS: ZZZ, MINATO-KU, TOKYO<br>SECURITY LEVEL: HIGH | 1105 |
| ☐ | CC BUILDING 7F, SHARE SPACE #1<br>ADDRESS: XYZ, MINATO-KU, TOKYO<br>SECURITY LEVEL: MEDIUM | 2001 |

PLEASE SELECT WORK SITE, AND PRESS RESERVATION BUTTON

[RESERVATION]   [CANCEL]

CONDITIONS

USE TIMING OF WORK SITE
[AFTER VISIT ▽]

DATE/TIME OF START OF VISIT
[13:00 ON APRIL 1 2019]

DATE/TIME OF END OF VISIT
[15:00 ON APRIL 1 2019]

WORK TIME AT WORK SITE
[20 MINUTES]

ADDRESS OF VISIT DESTINATION
[CCC, MINATO-KU, TOKYO]

THE NUMBER OF ATTENDANCES
[1]

SECURITY LEVEL
[MEDIUM ▽]

[RETRIEVE AGAIN] — 15

INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-170853 filed on Sep. 19, 2019.

BACKGROUND

(i) Technical Field

The present disclosure relates to an information processing system, and a non-transitory computer readable medium storing a program.

(ii) Related Art

For instance, Japanese Patent No. 5108831 discloses a sales activity support device that generates a first sales activity path along which the locations of customers to be visited absolutely on a date are arranged in the order of the time of visit; calculates an additional required time for visit of a sales person from the address of a start point of an interval to the address of an end point of the interval through the addresses of customers based on the addresses of the start point and the end point of the interval which is a path between locations of customers included in the generated first sales activity path, and on the addresses of the customers; calculates the difference by subtracting the calculated additional required time for visit from the time interval since the time when visit to the customer at the start of an interval is finished to the time when visit to the customer at the end of the interval is started; and presenting candidates for the customers that can be visited for each interval in descending order of the difference.

SUMMARY

For instance, when visiting a customer at a destination to be visited, a visitor may desire to work at a work site outside the company before or after the visit. Conventionally, the visitor needs to find a work site from multiple work sites by himself/herself, the work site satisfying the conditions for the visit.

Aspects of non-limiting embodiments of the present disclosure relate to an information processing system that facilitates selection of a work site by a visitor, as compared with when the visitor finds a work site from multiple work sites by himself/herself.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: an identification unit that identifies a condition for use of a work site according to a purpose of visit of a visitor; and a presentation unit that presents candidates for the work site which satisfy the condition for use identified by the identification unit.

BRIEF DESCRIPTION OF THE DRAWINGS

Exemplary embodiment of the present disclosure will be described in detail based on the following figures, wherein:

FIG. 3 is a block diagram illustrating a functional configuration example of the system according to the exemplary embodiment;

FIGS. 4A and 4B each illustrates an example of a visit purpose table;

FIGS. 8A and 8B are screens each illustrating an example of a screen that receives input of information on customer visit;

FIG. 9 illustrates an example of a screen for candidates for work site; and

FIG. 10 illustrates an example of a screen for candidates for work site.

DETAILED DESCRIPTION

Hereinafter an exemplary embodiment of the disclosure will be described with reference to the drawings.

<Overall Configuration of System>

Figure 1:
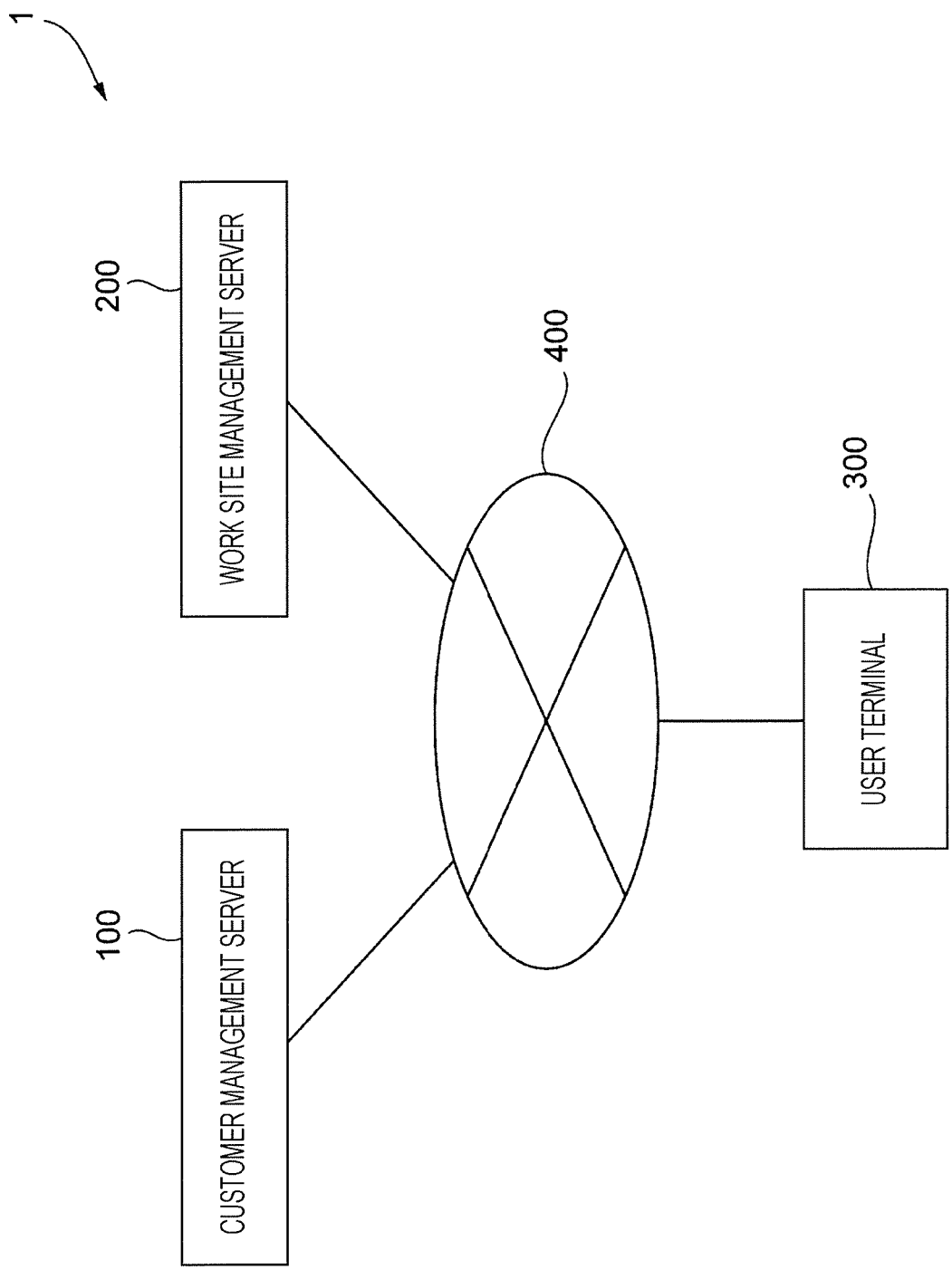
FIG. 1 is a diagram illustrating an overall configuration example of a system according to an exemplary embodiment.

FIG. 1 is a diagram illustrating an overall configuration example of a system 1 according to the exemplary embodiment. As illustrated, in the system 1 according to the exemplary embodiment, a customer management server 100, a work site management server 200, and a user terminal 300 are connected via a network 400. In the exemplary embodiment, the system 1 is used as an example of an information processing system.

The customer management server 100 is a server machine that manages information on customer visit. For instance, when a user (for instance, a visitor who visits a customer) accesses the customer management server 100 from the user terminal 300, a screen which receives input of information on customer visit is displayed on the user terminal 300. When the user inputs information on customer visit to the user terminal 300, the input information is transmitted to the customer management server 100, and is managed by the customer management server 100.

The work site management server 200 is a server machine that manages the work sites used by a user for doing work. In the exemplary embodiment, predetermined multiple work sites are prepared, and information on the work sites is stored in the work site management server 200.

It is to be noted that the work sites include, for instance, a meeting room in a building, a booth, and a table and a seat where a service is provided by a restaurant as examples. As an additional remark, a work site may be space separated from the surroundings by a wall or a partition, or may be space opened to the surroundings.

The user terminal 300 is a computer device operated by a user. The user terminal 300 includes, for instance, a personal computer (PC), a tablet terminal, and a smartphone, as examples.

The network 400 is a communication unit used for information communication between devices, and is, for instance, the Internet, a public line, and a local area network (LAN).

In the exemplary embodiment, when a user inputs information on a customer visit to the user terminal 300, the input information is transmitted to the work site management server 200 via the customer management server 100. The work site management server 200 retrieves candidates for work site utilized when a user visits a visit destination, based on the transmitted information. Information on the candidates for work site obtained by the retrieval is presented to the user via the customer management server 100. When the user selects a work site to be reserved from the presented candidates for work site, the information on the selected work site is transmitted to the work site management server 200 via the customer management server 100, and processing to reserve the work site is performed in the work site management server 200.

<Hardware Configuration of Device>

Figure 2:
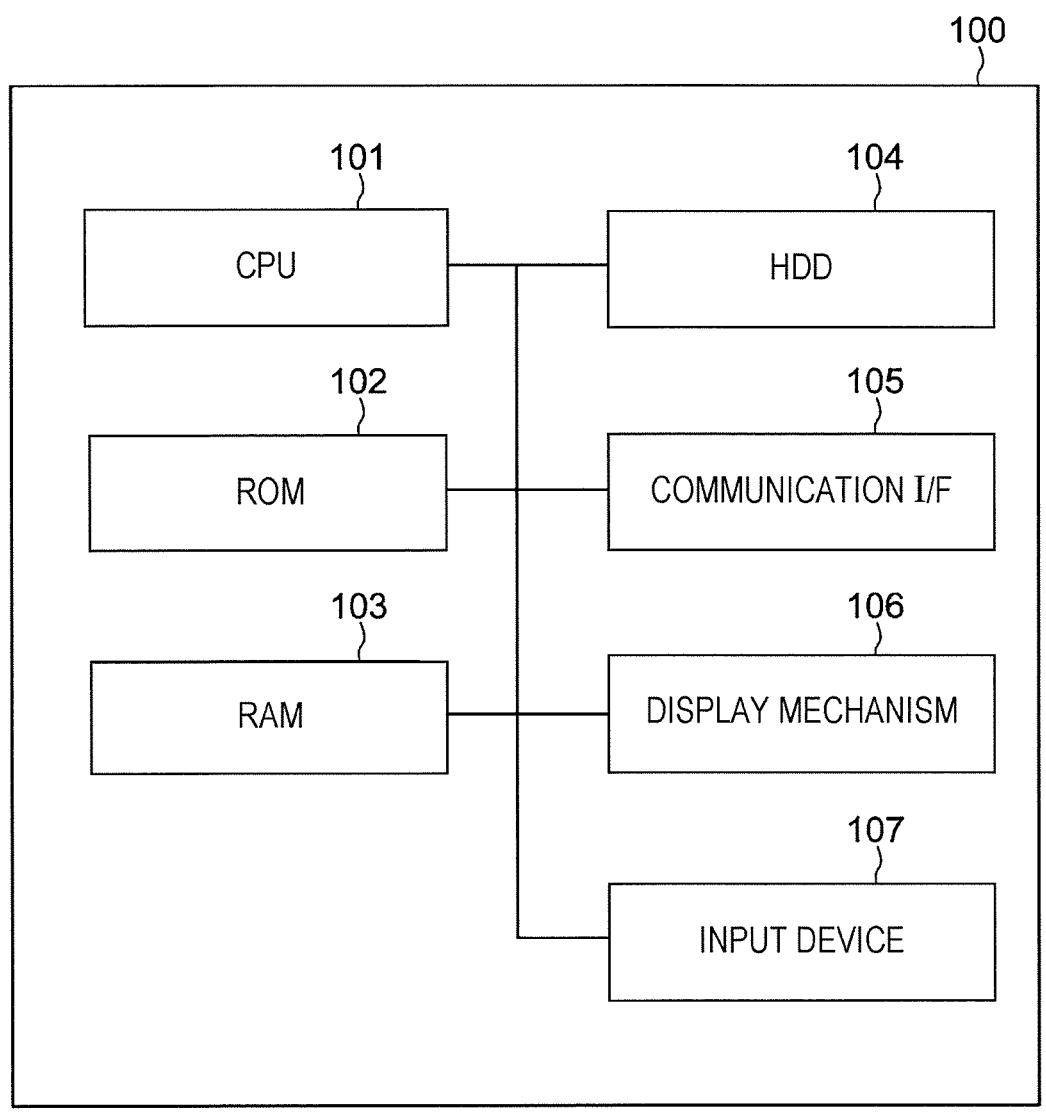
FIG. 2 is a diagram illustrating a hardware configuration example of a customer management server according to the exemplary embodiment.

FIG. 2 is a diagram illustrating a hardware configuration example of the customer management server 100 according to the exemplary embodiment.

As illustrated, the customer management server 100 includes a central processing unit (CPU) that is a calculation unit; a read only memory (ROM) 102 that is a storage space to store programs such as a basic input output system (BIOS); a random access memory (RAM) 103 that is an execution space for programs. In addition, the customer management server 100 includes a hard disk drive (HDD) 104 that is a storage space to store various programs such as an operating system (OS) and an application, input data to the various programs, and output data from the various programs. The programs stored in the ROM 102 and the HDD 104 are read to the RAM 103 and executed by the CPU 101, thereby implementing various functions of the customer management server 100.

Furthermore, the customer management server 100 includes a communication interface (communication IF) 105 for performing communication with the outside; a display mechanism 106 such as a display; and an input device 107 such as a keyboard and a mouse, and a touch panel.

It is to be noted that as an example, components similar to those of the hardware configuration of the customer management server 100 illustrated in FIG. 2 are used as the work site management server 200 and the user terminal 300.

<Functional Configuration of System>

FIG. 3 is a block diagram illustrating a functional configuration example of the system 1 according to the exemplary embodiment.

The customer management server 100 includes a customer visit information acquisition unit 111, a visit purpose table storage 112, a customer visit information transmitter 113, a work site candidate presentation unit 114, a work site selection reception unit 115, a reservation making requester 116, and a use history information storage 117.

The customer visit information acquisition unit 111 as an example of an identification unit acquires information on the customer visit from the user terminal 300 based on an operation performed by a user on the user terminal 300. Specifically, for instance, the date/time of start of visit, the date/time of end of visit, a purpose of visit, the number of attendances at customer visit, and information on the address of a visit destination are acquired.

Here, the purpose of visit is a purpose of visit by a visitor, and is prepared by a fixed list. Specifically, the purpose of visit is, for instance, product explanation, customer survey, proposal, estimate, contract, product delivery, and regular visit. A relevant purpose of visit is specified by a user from these purposes of visit. However, the purpose of visit may be directly inputted by a user rather than specified by a user from a fixed list.

In addition, for each of the purposes of visit, the conditions for necessity/unnecessity of use of work site and timing of use, a required security level of work site, and a work time are defined in advance. Then these conditions are identified according to the purpose of visit specified by a user.

For instance, as the condition for necessity/unnecessity of use of work site and timing of use, whether or not use of work site is necessary is defined according to the purpose of visit. When use of work site is necessary, timing of use is further defined. As the condition for timing of use, whether the work site is used before visit or used after visit is defined.

In addition, as the condition for required security level of work site, for instance, multiple stages of security level are defined, and which one of the stages of security level is required is defined according to the purpose of visit. The security level is determined based on the configuration of work space at a work site. As an additional remark, the configuration of work space at a work site is, for instance, whether or not the work site is an individual space, whether or not there is a wall on the back of the work site, and whether it is far or close to an adjacent desk. In addition, a network environment such as an internet access environment is also included in the configuration of work space at a work site.

As the condition for work time, the condition for time during which a work site may be used is defined, for instance, in units of 10 minutes or 30 minutes according to the purpose of visit.

In the exemplary embodiment, the conditions for necessity/unnecessity of use of work site and timing of use, a required security level of work site, and a work time are used as an example of conditions for use of work site according to the purpose of visit. In addition, a security level is used as an example of confidentiality of work site.

The visit purpose table storage 112 stores a table (hereinafter referred to as a "visit purpose table") that defines the conditions for use of work site for each of the purposes of visit. As described above, the conditions for use of work site are the conditions for necessity/unnecessity of use of work site and timing of use, a required security level of work site, and a work time.

The customer visit information transmitter 113 transmits information to the customer visit information transmitter 113, the information being on customer visit and used for reservation of a work site. Specifically, conditions (that is, the conditions for necessity/unnecessity of use of work site and timing of use, required security level of work site, and work time) identified according to, for instance, the date/time of start of visit, the date/time of end of visit, the number of attendances at customer visit, information on the address of visit destination, and purpose of visit are transmitted to the work site management server 200.

The work site candidate presentation unit 114 as an example of a presentation unit outputs information on candidates for a work site to the user terminal 300, the information being received from the later-described work site retrieval unit 212 of the work site management server 200. As an additional remark, the work site candidate presentation unit 114 presents candidates for work site utilized when a user visits a visit destination, based on the information received from the work site retrieval unit 212. In other words, the work site candidate presentation unit 114 presents candidates for work site, which satisfy the conditions for use of work site according to the purpose of visit. The presented candidates for work site are displayed on the screen of the user terminal 300.

The work site selection reception unit 115 receives selection of a work site to be reserved from the candidates for work site based on an operation performed by a user on the user terminal 300.

For a work site selected by a user, the reservation making requester 116 requests the work site management server 200 to make reservation for the work site. When reservation is made by the work site management server 200, the reservation making requester 116 registers a plan for using the work site in a schedule managed for each of users.

The use history information storage 117 as an example of a storage stores use history information which indicates a history of use of work sites. The use history information includes, for instance, a history of reservation of work site, and a history of actual use of work site.

More particularly described, the history of reservation of work site includes, for instance, information such as the name, address, security level, and capacity of a work site, scheduled date/time of use of the work site, the date/time of start of visit of a customer, the date/time of end of visit of the customer when the work site is used, the number of attendances at customer visit, the address of a visit destination, a purpose of visit, and timing of use for the work site.

The history of use of work site includes, for instance, information such as the name, address, security level, and capacity of a work site used, the date/time of use of the work site, the date/time of start of visit of a customer, the date/time of end of visit of the customer when the work site is used, the number of attendances at customer visit, the address of visit destination, a purpose of visit, and timing of use for the work site.

It is to be noted that for instance when reservation for a work site is made by the work site management server 200, the use history information is transmitted from the work site management server 200 to the customer management server 100. For instance, after a user actually uses a work site, relevant information is detected at the work site or inputted by the user, and thus is acquired by the work site management server 200, and the acquired information is transmitted from the work site management server 200 to the customer management server 100.

The functional components included in the customer management server 100 are implemented by interaction between software and hardware resources. Specifically, for instance when the customer management server 100 is implemented by the hardware configuration illustrated in FIG. 2, various programs stored in the ROM 102 and the HDD 104 are read to the RAM 103, and executed by the CPU 101, thereby implementing the functional components: the customer visit information acquisition unit 111, the customer visit information transmitter 113, the work site candidate presentation unit 114, the work site selection reception unit 115, and the reservation making requester 116 illustrated in FIG. 3. In addition, the visit purpose table storage 112, and the use history information storage 117 are implemented by the HDD 104, for instance.

The work site management server 200 includes a customer visit information receiver 211, a work site retrieval unit 212, a work site reservation maker 213, and a work site information storage 214.

The customer visit information receiver 211 receives information on customer visit sent from the customer visit information transmitter 113 of the customer management server 100.

The work site retrieval unit 212 as an example of a presentation unit retrieves candidates for work site to be used by a user, based on the information received by the customer visit information receiver 211, and outputs information on the candidates for work site. As an additional remark, the work site retrieval unit 212 outputs the information on the candidates for work site which satisfy the conditions for use of work site according to the purpose of visit, based on the information received by the customer visit information receiver 211.

Specifically, for instance, the work site retrieval unit 212 retrieves work sites in the vicinity (for instance, within 1 km) of the address at a visit destination from predetermined multiple work sites. In this process, work sites are retrieved, which satisfy the condition for required security level and can accommodate the number of attendances at customer visit.

Subsequently, the work site retrieval unit 212 calculates scheduled date/time of use for each of the work sites found by the retrieval. For calculation of the scheduled date/time of use, pieces of information, such as the date/time of start of visit, the date/time of end of visit, necessity/unnecessity of use of work site and timing of use, a work time, and an estimated travel time between a work site and a visit destination, are used.

Subsequently, the work site retrieval unit 212 checks whether each work site is unreserved and available on the scheduled date/time of use of the work site. The work site retrieval unit 212 then transmits information on the work site unreserved and available to the customer management server 100 as a candidate for work site to be used by a user. The transmitted information on work site includes information used as reference by a user for selecting a work site, and information that identifies a work site when reservation is made. Specifically, the information used as reference by a user for selecting a work site is, for instance, the name of the work site, the address and security level of the work site. The information that identifies a work site when a reservation is made is, for instance, an ID assigned to each of work sites to identify the work site.

The work site reservation maker 213 makes reservation for a work site based on a request from the reservation making requester 116 of the customer management server 100.

The work site information storage 214 stores various pieces of information on work sites. For instance, for each of the work sites, the name, address, security level, and capacity of the work site are stored. In addition, for each of the work sites, information on reservation is also stored. The information on reservation includes, for instance, whether or not reservation is made, reserved date/time when reservation is made, and information of an individual who has made reservation.

The functional components included in the work site management server 200 are implemented by interaction between software and hardware resources. Specifically, for instance when the work site management server 200 is implemented by the hardware configuration illustrated in FIG. 2, various programs stored in the ROM 102 and the HDD 104 are read to the RAM 103, and executed by the CPU 101, thereby implementing the functional components: the customer visit information receiver 211, the work site retrieval unit 212, and the work site reservation maker 213 illustrated in FIG. 3. In addition, the work site information storage 214 is implemented by the HDD 104, for instance.

<Description of Visit Purpose Table>

FIGS. 4A and 4B each illustrates an example of a visit purpose table.

In the example illustrated in FIG. 4A, product explanation, customer survey, proposal, estimate, contract, product delivery, and regular visit are registered as the purposes of visit. Each of the purposes of visit is associated with the conditions for necessity/unnecessity of use of work site and timing of use, a required security level of work site, and a work time.

For instance, when the purpose of visit is "PRODUCT EXPLANATION", the conditions that the work site is used before customer visit, the required security level is medium, and the work time is 30 minutes are defined.

For instance, when the purpose of visit is "REGULAR VISIT", the condition that use of the work site is unnecessary is defined.

The security level is defined as one of three levels: high, medium, and low. As illustrated in FIG. 4B, the configuration of work space is defined for each security level.

For instance, the security level of "high" indicates that the work space is individual space. The security level of "medium" indicates that there is a wall on the back of the work site, and the distance to the adjacent site is greater than or equal to 3 m. The security level of "low" indicates that the distance to the adjacent site is less than 3 m. One of the security levels is assigned to each work site according to the definition.

<Steps of Processing to Transmit Information Used for Reserving Work Site>

Figure 5:
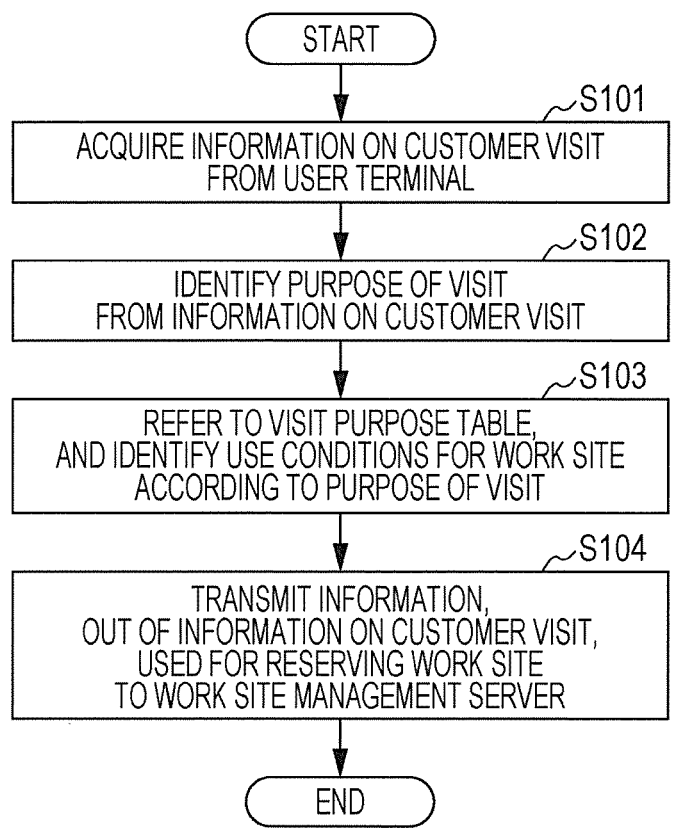
FIG. 5 is a flowchart illustrating an example of steps of the processing to transmit information used for reserving a work site from a customer management server to a work site management server.

FIG. 5 is a flowchart illustrating an example of steps of the processing to transmit information used for reserving a work site from the customer management server 100 to the work site management server 200.

For instance, a user performs an operation on the user terminal 300, and thereby screen information on a screen which receives input of the information on customer visit is transmitted from the customer management server 100 to the user terminal 300. The screen is displayed on the user terminal 300. When a user inputs information on customer visit on the screen, the customer visit information acquisition unit 111 acquires the information on customer visit from the user terminal 300 (S101). Specifically, for instance, pieces of information, such as the date/time of start of visit, the date/time of end of visit, a purpose of visit, the number of attendances at customer visit, and the address at a visit destination are acquired.

Subsequently, the customer visit information acquisition unit 111 identifies the purpose of visit out of the information on customer visit (S102). Next, the customer visit information acquisition unit 111 refers to the visit purpose table, and identifies the conditions (specifically, necessity/unnecessity of use of work site and timing of use, a required security level of work site, and a work time) for use of work site according to the purpose of visit (S103).

Subsequently, the customer visit information transmitter 113 transmits information to the work site management server 200, the information being on customer visit and used for reservation of a work site (S104). Specifically, for instance, the date/time of start of visit, the date/time of end of visit, the number of attendances at customer visit, information on the address at a visit destination, and the conditions (specifically, necessity/unnecessity of use of work site and timing of use, a required security level of work site, and a work time) identified according to the purpose of visit are transmitted. Then the processing flow ends.

<Steps of Processing to Output Information on Candidates for Work Site>

Figure 6:
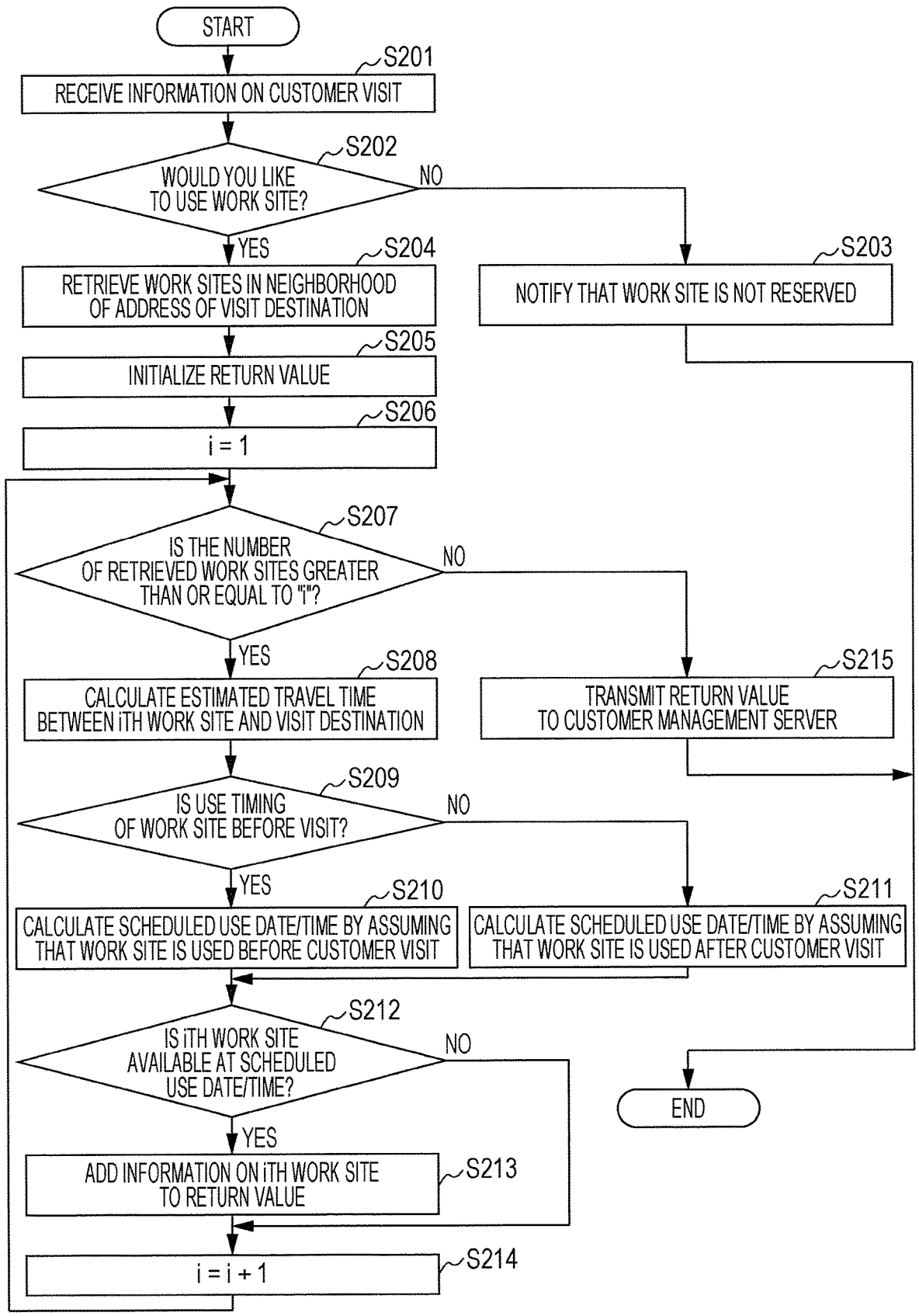
FIG. 6 is a flowchart illustrating an example of steps of the processing performed by the work site management server to retrieve a work site and output information on candidates for the work site to the customer management server.

FIG. 6 is a flowchart illustrating an example of steps of the processing performed by the work site management server 200 to retrieve a work site and output information on candidates for the work site to the customer management server 100.

First, the customer visit information receiver 211 receives the information on customer visit sent in S104 of FIG. 5 (S201). Subsequently, the work site retrieval unit 212 determines whether or not the work site is used, based on the information received by the customer visit information receiver 211 (S202). The determination is made based on the condition, identified according to the purpose of visit, for necessity/unnecessity of use of work site. When negative determination (NO) is made in S202, the work site retrieval unit 212 notifies to the customer management server 100 that the work site is not reserved (S203). Then the processing flow ends.

When positive determination (YES) is made in S202, the work site retrieval unit 212 retrieves work sites in the vicinity of the address at a visit destination from predetermined multiple work sites (S204). In this process, the work site retrieval unit 212 retrieves work sites which satisfy the condition for a required security level and can accommodate the number of attendances at customer visit, based on the information received by the customer visit information receiver 211 and the various pieces of information on work sites stored in the work site information storage 214.

Subsequently, the work site retrieval unit 212 initializes a return value (S205). Next, the work site retrieval unit 212 sets "i=1" (S206).

Subsequently, the work site retrieval unit 212 determines whether or not the number of work sites found by the retrieval is greater than or equal to the value of "i" (S207).

When negative determination (NO) is made in S207, the flow proceeds to S215 described later.

When positive determination (YES) is made in S207, the work site retrieval unit 212 calculates an estimated travel time between the "ith work site" and the visit destination (S208). For calculation of the estimated travel time, an external system or an application is used, which can retrieve paths using a train, an automobile, or on foot all at once.

Subsequently, the work site retrieval unit 212 determines whether or not the timing of using the work site is before visit based on the information received by the customer visit information receiver 211 (S209). The determination is made based on the condition for the timing of using the work site, identified according to the purpose of visit.

When positive determination (YES) is made in S209, the work site retrieval unit 212 calculates scheduled date/time of use of the work site by assuming that the work site is used before customer visit (S210). Specifically, the date/time of start of using the work site is obtained by subtracting the estimated travel time between the "ith work site" and the visit destination and the work time from the data/time of start of visit. The date/time of end of using the work site is obtained by adding the work time to the date/time of start of using the work site.

On the other hand, when negative determination (NO) is made in S209, the work site retrieval unit 212 calculates scheduled date/time of use of the work site by assuming that the work site is used after customer visit (S211). Specifically, the date/time of start of using the work site is obtained by adding the estimated travel time between the "ith work site" and the visit destination to the data/time of end of visit. The date/time of end of using the work site is obtained by adding the work time to the date/time of start of using the work site.

Subsequently, the work site retrieval unit 212 determines whether or not the "ith work site" is unreserved and available on the scheduled date/time of use of the work site (S212). When the processing in S210 is performed, it is determined whether or not the "ith work site" is available on the scheduled date/time of use calculated in S210. When the processing in S211 is performed, it is determined whether or not the "ith work site" is available on the scheduled date/time of use calculated in S211.

When positive determination (YES) is made in S212, the work site retrieval unit 212 adds information on the "ith work site" to the return value.

When negative determination (NO) is made after S213 or in S212, the work site retrieval unit 212 sets "i=i+1 (that is, 1 is added to i)" (S214). Then the flow proceeds to S207.

When negative determination (NO) is made in S207, the work site retrieval unit 212 transmits the return value to the customer management server 100 as the information on the candidates for work site used by a user (S215). Specifically, as a candidate for work site, for instance, the name of the work site, the address, security level of the work site, and an ID of the work site are transmitted. Then the processing flow ends.

<Steps of Processing to Request to Make Reservation for Work Site>

Figure 7:
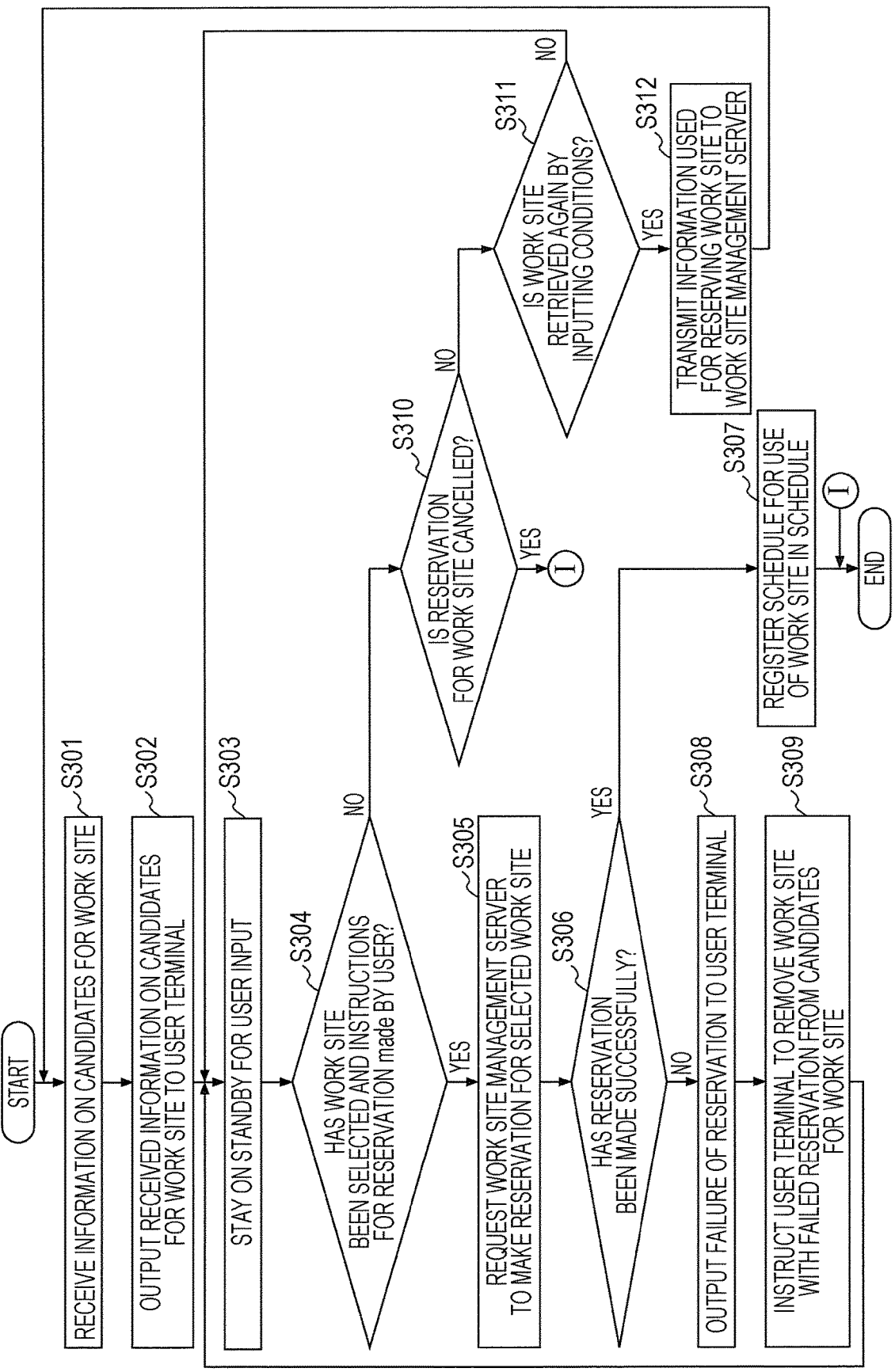
FIG. 7 is a flowchart illustrating an example of steps of the processing performed by the customer management server to request the work site management server to make reservation for a work site.

FIG. 7 is a flowchart illustrating an example of steps of the processing performed by the customer management server 100 to request the work site management server 200 to make reservation for a work site.

First, the work site candidate presentation unit 114 receives the information on the candidates for work site transmitted in S215 of FIG. 6 (S301). Next, the work site candidate presentation unit 114 outputs the received information on the candidates for work site to the user terminal 300 (S302). The output information is displayed on the screen of the user terminal 300. Subsequently, the work site selection reception unit 115 waits for input by a user (S303). Subsequently, the work site selection reception unit 115 determines whether or not a user has selected a work site and given instructions to reserve the work site (S304).

When positive determination (YES) is made in S304, the reservation making requester 116 requests the work site management server 200 to make reservation for the work site selected by a user (S305). Subsequently, the reservation making requester 116 determines whether or not reservation has been successfully made by the work site management server 200 (S306). The determination is made, for instance, based on the contents of a reservation result notified by the work site reservation maker 213 of the work site management server 200.

When positive determination (YES) is made in S306, the reservation making requester 116 registers a plan for using the work site in a schedule managed for each of users (S307). Then the processing flow ends.

On the other hand, when negative determination (NO) is made in S306, the work site candidate presentation unit 114 outputs failure of reservation to the user terminal 300 (S308). The output information is displayed on the screen of the user terminal 300. The work site candidate presentation unit 114 then instructs the user terminal 300 to remove the work site with the failed reservation from the candidates for work site (S309). The instruction causes the information on the work site with the failed reservation to be deleted from the candidates for work site on the screen of the user terminal 300. Then the flow proceeds to S303.

When negative determination (NO) is made in S304, the work site selection reception unit 115 determines whether or not a user has cancelled the reservation for work site (S310). When positive determination (YES) is made in S310, the processing flow ends. On the other hand, when negative determination (NO) is made in S310, the work site selection reception unit 115 determines whether or not a user has input conditions and selected retrieval of a work site again (S311). When negative determination (NO) is made in S311, the flow proceeds to S303. On the other hand, when positive determination (YES) is made in S311, the customer visit information transmitter 113 transmits information used for reserving a work site to the work site management server 200 again (S312). The processing illustrated in FIG. 6 is performed again by performing the processing in S312. Then the flow proceeds to S301.

<Specific Example of Processing to Transmit Information Used for Reserving Work Site>

Next, the processing to transmit information used for reserving a work site from the customer management server 100 to the work site management server 200 will be described by way of a specific example.

It is to be noted that the steps shown below correspond to the steps in FIG. 5.

FIGS. 8A and 8B are screens each illustrating an example of a screen that receives input of information on customer visit.

In the example illustrated in FIG. 8A, an input column is provided for each of the date/time of start of visit, the date/time of end of visit, a purpose of visit, the number of attendances at customer visit, names of attendances, name of visit destination, the address of a visit destination, and person in charge of a visit destination. When a user selects a registration button 11, the information inputted to each input column is transmitted to the customer management server 100. The customer visit information acquisition unit 111 of the customer management server 100 acquires the transmitted information (S101).

It is to be noted that the purposes of visit are displayed, for instance, in the pull-down list as illustrated in FIG. 8B, and a purpose of visit is selected by a user. In this example, a user is assumed to select "PRODUCT EXPLANATION" as the purpose of visit.

Subsequently, the customer visit information acquisition unit 111 identifies the "PRODUCT EXPLANATION" as the purpose of visit (S102). Next, the customer visit information acquisition unit 111 refers to the visit purpose table, and identifies the conditions for use of work site according to the purpose of visit (S103). In this example, the visit purpose table illustrated in FIG. 4 is assumed to be used. Here, as the conditions according to the "PRODUCT EXPLANATION", it is identified that necessity/unnecessity of use of work site and timing of use is "PRE-VISIT USE", the required security level of work site is "MEDIUM", and the work time is "30 MINUTES".

Subsequently, the customer visit information transmitter 113 transmits information used for reserving a work site to the work site management server 200 (S104). In this example, the date/time of start of visit "13:00 on APRIL 1 2019", the date/time of end of visit "15:00 on APRIL 1 2019", the number of attendances "1", the address at a visit destination "CCC, MINATO-KU, TOKYO", necessity/unnecessity of use of work site and timing of use "PRE-VISIT USE", the required security level of work site "MEDIUM", and the work time "30 MINUTES" are transmitted.

<Specific Example of Processing to Output Information on Candidates for Work Site>

Next, the processing performed by the work site management server 200 to retrieve work sites and output information on the candidates for work site to the customer management server 100 will be described by way of a specific example. In this example, the information used for reserving work site is assumed to be transmitted from the customer management server 100 to the work site management server 200 based on the example illustrated in FIGS. 8A and 8B.

It is to be noted that the steps shown below correspond to the steps in FIG. 6.

The customer visit information receiver 211 receives information on customer visit (S201). Specifically, the customer visit information receiver 211 receives the date/time of start of visit "13:00 on APRIL 1 2019", the date/time of end of visit "15:00 on APRIL 1 2019", the number of attendances "1", the address at a visit destination "CCC, MINATO-KU, TOKYO", necessity/unnecessity of use of work site and timing of use "PRE-VISIT USE", the required security level of work site "MEDIUM", and the work time "30 MINUTES". Here, since the necessity/unnecessity of use of work site and timing of use is "PRE-VISIT USE", the work site retrieval unit 212 determines that the work site is used (YES in S202).

Subsequently, the work site retrieval unit 212 retrieves work sites in the vicinity of the address at the visit destination "CCC, MINATO-KU, TOKYO" from predetermined multiple work sites (S204). For instance, the work site retrieval unit 212 retrieves work sites which are within 1 km from the address at the visit destination "CCC, MINATO-KU, TOKYO", have a security level of "MEDIUM" or higher (that is, "MEDIUM" or "HIGH"), and the capacity of "1" or greater. It is assumed that five work sites have been retrieved by the retrieval.

Subsequently, the work site retrieval unit 212 initializes the return value (S205), and sets "i=1" (S206). Next, since the number of work sites found by the retrieval is 5, which is greater than i (=1) (YES in S207), the work site retrieval unit 212 calculates an estimated travel time between the 1st one of 5 work sites and the visit destination (S208). In this example, the estimated travel time is assumed to be 10 minutes.

Next, since the timing of using a work site is "PRE-VISIT USE" (YES in S209), the work site retrieval unit 212 calculates scheduled date/time of use of the work site by assuming that the work site is used before customer visit (S210). In this example, the work site retrieval unit 212 obtains the date/time of start of using the work site by subtracting the estimated travel time "10 minutes" and the work time "30 minutes" from the date/time of start of visit "13:00 on APRIL 1 2019". Thus, the date/time of start of using the work site is "12:20 on APRIL 1 2019". In addition, the work site retrieval unit 212 obtains the date/time of end of using the work site by adding the work time "30 minutes" to the date/time of start of using the work site "12:20 on APRIL 1 2019". Thus, the date/time of end of using the work site is "12:50 on APRIL 1 2019".

Subsequently, the work site retrieval unit 212 determines whether or not the 1st work site is unreserved and available during the time interval 12:20 to 12:50 on APRIL 1 2019 (S212). When the work site is available during the time interval (YES in S212), the work site retrieval unit 212 adds the information on the 1st work site to the return value (S213). Subsequently, the work site retrieval unit 212 sets "i=2" (S214). The flow proceeds to S207, and for each of the remaining 4 of the 5 work sites found by the retrieval, it is determined whether or not the work site is unreserved on the scheduled date/time of use of work site.

When for each of all 5 work sites found by the retrieval, it is determined whether or not the work site is unreserved on the scheduled date/time of use of work site, "i=6" is set. Thus, the number (=5) of work sites found by the retrieval in S207 is determined to be smaller than i (=6) (NO in S207). Subsequently, the work site retrieval unit 212 transmits the return value to the customer management server 100 as the information on the candidates for work site (S215).

<Specific Example of Processing to Request to Make Reservation for Work Site>

Next, the processing performed by the customer management server 100 to request the work site management server 200 to make reservation for work site will be described by way of a specific example. In this example, 4 of the 5 work sites found by the retrieval in the above-described example are assumed to be output as the candidates for work site.

It is to be noted that the steps shown below correspond to the steps in FIG. 7.

The work site candidate presentation unit 114 receives information on the candidates for work site from the work site management server 200 (S301). In this example, for each of 4 work sites, the work site candidate presentation unit 114 receives the name of the work site, the address, security level of the work site, the ID of the work site. Subsequently, the work site candidate presentation unit 114 outputs the received information on the candidates for work site to the user terminal 300 (S302).

FIG. 9 and FIG. 10 illustrate an example of a screen showing candidates for work site.

In the example of FIG. 9, for each of 4 work sites, the name of the work site, the address, security level of the work site, and the ID of the work site are shown. In addition, for each of 4 work sites, a check box for receiving selection is prepared. In this example, a check box 12 for the work site with the ID=1105 is checked. When a user selects a reservation button 13, the work site selection reception unit 115 of the customer management server 100 determines that the user has given instructions to select and reserve the work site (YES in S303, S304). It is to be noted that when a user selects a cancel button 14 (NO in S303, S304, and YES in S310), reservation for work site is not made.

Subsequently, for the work site with the ID=1105 selected by a user, the reservation making requester 116 requests the work site management server 200 to make reservation for the work site (S305). The work site reservation maker 213 of the work site management server 200 makes reservation for the work site based on the request from the reservation making requester 116. The work site reservation maker 213 makes reservation for the scheduled date/time of use calculated by the work site retrieval unit 212. Specifically, for instance, when the date/time of start of visit is "13:00 on APRIL 1 2019", the date/time of end of visit is "15:00 on APRIL 1 2019", and the timing of using the work site is "PRE-VISIT USE", reservation is made for the time interval 12:20 to 12:50 on APRIL 1 2019.

When reservation is successfully made (YES in S306), the reservation making requester 116 of the customer management server 100 registers a plan of using the work site in the schedule of a user who has made reservation (S307).

On the other hand, for instance when making reservation is failed because another user has made reservation earlier (NO in S306), a message saying that making reservation has been failed is displayed on the user terminal 300 (S308). On the screen showing the candidates for work site, information on the work site (that is, the work site with the ID=1105) with the failed reservation is deleted (S309).

When there is no work site for which a user wants to make reservation or there is no candidate itself for work site, the user may input conditions for another retrieval. In the example illustrated in FIG. 10, an input column is provided for each of the timing of using work site, the date/time of start of visit, the date/time of end of visit, a work time at work site, the address of a visit destination, the number of users, and a security level.

For the date/time of start of visit, the date/time of end of visit, the address of visit destination, and the number of users, a user may input information different from already input information as the information on customer visit. For the timing of using work site, a work time at work site, and a security level, a user may input conditions different from the conditions identified from the visit purpose table. For instance, when the purpose of visit is "PRODUCT EXPLANATION", the timing of use is "PRE-VISIT USE", the required security level of work site is "MEDIUM", and the work time is "30 MINUTES". However, as illustrated in FIG. 10, the timing of use may be "POST-VISIT USE", or the work time may be "20 MINUTES".

When a user selects a retrieval button 15, the work site selection reception unit 115 determines that a user has selected the operation of retrieval (NO in S304, NO in S310, YES in S311). The information input to each input column is transmitted from the user terminal 300 to the customer management server 100, and the customer visit information transmitter 113 of the customer management server 100 transmits the information to the work site management server 200 (S312). As a consequence, the processing to retrieve work sites is performed by the work site management server 200. As an additional remark, since work sites are retrieved according to the information input by a user, candidates for work site are presented, which have contents different from those of the candidates for work site already presented to a user.

<Modifications>

Next, a modification of the exemplary embodiment will be described.

(Visit Site as Retrieval Target)

In the example described above, the work site retrieval unit 212 has retrieval targets of work sites in the vicinity of the address of a visit destination. However, this is not always the case. For instance, instead of the work sites in the vicinity of the address of a visit destination, the work sites in the vicinity of the nearest station to the address of a visit destination, or the work sites in the vicinity of a transfer station on a path from a start point to a destination of visit may be retrieval targets. It is to be noted that as the start point, a place registered by a user or the current location of the user terminal 300 acquired by a global positioning system (GPS) may be used.

Multiple retrieval targets may be provided. For instance, the work site retrieval unit 212 may have retrieval targets of work sites in the vicinity of the address of a visit destination as well as retrieval targets of work sites in the vicinity of a transfer station.

(Processing Performed when Work Site with Short Travel Time is Candidate)

In the exemplary embodiment, a candidate for work site may be such a work site that the travel time for a path from a start point to a visit destination through the work site is short.

Specifically, for instance, in the work site management server 200, the work site retrieval unit 212 defines a threshold value for travel time, and adds a condition to the conditions for a candidate for work site, the condition being that the travel time for a path from a start point to a visit destination through the work site is less than or equal to the threshold value. Alternatively, for instance, the work site retrieval unit 212 may output work sites among the work sites found by the retrieval as the information on candidates for work site, the work sites each allowing a short travel time for a path from a start point to a visit destination through the work site (for instance, three work sites respectively having the first to third shortest travel times).

In addition, for instance, the work site candidate presentation unit 114 of the customer management server 100 may present work sites to a user as the candidates for work site, the work sites each allowing a short travel time for a path from a start point to a visit destination through the work site (for instance, three work sites respectively having the first to third shortest travel times) and being among the candidates for work site obtained from the work site management server 200.

(Processing Performed when Multiple Visits are Made)

In the exemplary embodiment, when a user makes multiple visits, candidates for work site in consideration of multiple visits may be presented.

For instance, when a user makes customer visit 2 after making customer visit 1, it is assumed that the purpose of the customer visit 1 is "CUSTOMER SURVEY" and the purpose of the customer visit 2 is "PRODUCT EXPLANATION". In this case, the timing of using work site in the customer visit 1 is "POST-VISIT USE", and the timing of using work site in the customer visit 2 is "PRE-VISIT USE". Thus, after the customer visit 1 is finished, the work site retrieval unit 212 performs the work for the customer visit 1 and the work for the customer visit 2 collectively before the customer visit 2, thus the same work site may be retrieved for the customer visit 1 and the customer visit 2.

For instance, the work site retrieval unit 212 retrieves visit sites according to a predetermined order of priority. Specifically, for instance, the work site retrieval unit 212 retrieves the work sites in the vicinity of the address of the visit destination of the customer visit 2 and in the vicinity of the nearest station to the address of the visit destination of the customer visit 2 as the work sites with the highest order of priority. The work site retrieval unit 212 retrieves the work sites in the vicinity of the address of the visit destination of the customer visit 1 and in the vicinity of the nearest station to the address of the visit destination of the customer visit 1 as the work sites with the second highest order of priority. In addition, the work site retrieval unit 212 retrieves the work sites in the vicinity of a transfer station on a path from the visit destination of the customer visit 1 to the visit destination of the customer visit 2 as the work sites with the third highest order of priority.

For the work time at the work site, for instance, the work time for the customer visit 1 and the work time for the customer visit 2 are added together. In addition, as the required security level of the work site, a higher one of the security level for the customer visit 1 and the security level for the customer visit 2 is used, for instance. As the number of users of the work site, a greater one of the number of attendances at the customer visit 1 and the number of attendances at the customer visit 2 is used.

In this manner, the same work site is retrieved for the customer visit 1 and the customer visit 2, and is presented to a user.

It is to be noted that such processing may be performed by the work site candidate presentation unit 114 of the customer management server 100. For instance, the work site candidate presentation unit 114 may acquire information on the candidates for work site for the customer visit 1 and information on the candidates for work site for the customer visit 2 from the work site management server 200, and may present the same work site for the customer visit 1 and the customer visit 2 based on the acquired information.

Alternatively, a candidate for work site may be such a work site that has a short travel time for a path from the visit destination of the customer visit 1 to the visit destination of the customer visit 2 through the work site.

Specifically, for instance, in the work site management server 200, the work site retrieval unit 212 defines a threshold value for travel time, and adds a condition to the conditions for a candidate for work site, the condition being that the travel time for a path from the visit destination of the customer visit 1 to the visit destination of the customer visit 2 through the work site is less than or equal to the threshold value. Alternatively, for instance, the work site retrieval unit 212 may output work sites among the work sites found by the retrieval as the information on candidates for work site, the work sites each allowing a short travel time from the visit destination of the customer visit 1 to the visit destination of the customer visit 2 through the work site (for instance, three work sites respectively having the first to third shortest travel times).

In addition, for instance, the work site candidate presentation unit 114 of the customer management server 100 may present work sites to a user as the candidates for work site, the work sites each allowing a short travel time from the visit destination of the customer visit 1 to the visit destination of the customer visit 2 through the work site (for instance, three work sites respectively having the first to third shortest travel times) and being among the candidates for work site obtained from the work site management server 200.

Next, another example in which the same work site is retrieved for the customer visit 1 and the customer visit 2 will be described. For instance, when the timing of using the work site for the customer visit 1 and the timing of using the work site for the customer visit 2 are both "POST-VISIT USE", a work site is retrieved by assuming that the work site is used after each customer visit is finished. After the customer visit 1 is finished, there may not be enough time for using the work site for the customer visit 1 before the customer visit 2. In such a situation, the work site retrieval unit 212 may retrieve the same work site for the customer visit 1 and the customer visit 2 by assuming that the work for the customer visit 1 and the work for the customer visit 2 are collectively performed after the customer visit 2.

Here, similarly to the example described above, for instance, the work site retrieval unit 212 retrieves visit sites according to a predetermined order of priority. Specifically, for instance, the work site retrieval unit 212 retrieves the work sites in the vicinity of the address of the visit destination of the customer visit 2 and in the vicinity of the nearest station to the address of the visit destination of the customer visit 2 as the work sites with the highest order of priority. For the work time at the work site, for instance, the work time for the customer visit 1 and the work time for the customer visit 2 are added together. In addition, as the required security level of the work site, a higher one of the security level for the customer visit 1 and the security level for the customer visit 2 is used, for instance. As the number of users of the work site, for instance, a greater one of the number of attendances at the customer visit 1 and the number of attendances at the customer visit 2 is used.

Furthermore, another example in which the same work site is retrieved for the customer visit 1 and the customer visit 2 will be described.

For instance, when the timing of using the work site for the customer visit 1 and the timing of using the work site for the customer visit 2 are both "PRE-VISIT USE", a work site is retrieved by assuming that the work site is used before each customer visit is finished. After the customer visit 1 is finished, there may not be enough time for using the work site for the customer visit 2 before the customer visit 2. In such a situation, the work site retrieval unit 212 may retrieve the same work site for the customer visit 1 and the customer visit 2 by assuming that the work for the customer visit 1 and the work for the customer visit 2 are collectively performed before the customer visit 1.

Here, similarly to the example described above, for instance, the work site retrieval unit 212 retrieves visit sites according to a predetermined order of priority. Specifically, for instance, the work site retrieval unit 212 retrieves the work sites in the vicinity of the address of the visit destination of the customer visit 1 and in the vicinity of the nearest station to the address of the visit destination of the customer visit 1 as the work sites with the highest order of priority. For the work time at the work site, for instance, the work time for the customer visit 1 and the work time for the customer visit 2 are added together. In addition, as the required security level of the work site, a higher one of the security level for the customer visit 1 and the security level for the customer visit 2 is used. As the number of users of the work site, a greater one of the number of attendances at the customer visit 1 and the number of attendances at the customer visit 2 is used.

(Processing Performed when a Customer Visit is Already Scheduled and Another Customer Visit is Added)

When a user already has scheduled customer visit and reserved a work site, the user may add another customer visit. In this case, processing similar to the above-described processing in the case where multiple customer visits are made may be performed, and work sites may be presented to a user. As a consequence, candidates for work site are presented, which have contents different from those of the candidates for work site already presented to a user. When one of the work sites presented here is selected by a user and the selected work site is reserved, reservation of an already reserved work site is cancelled.

(Processing Performed when Candidates for Work Site are Presented Using Use History Information of Work Site)

The work site candidate presentation unit 114 may present candidates for work site using the use history information of the work sites.

For instance, the work site candidate presentation unit 114 presents candidates for work site as the use history information of work sites based on the purpose of visit to work sites.

Specifically, when the purpose of visit is "PROPOSAL", thorough advance preparation is necessary, thus a work site in a quiet environment tends to be used. In this case, when presenting work sites with the purpose of visit of "PROPOSAL", the work site candidate presentation unit 114 presents work sites in a quiet environment as a priority among the candidates for work site acquired from the work site management server 200. It is to be noted that a work site in a quiet environment refers to, for instance, a work site in a suburban area, a work site in a park, and a work site where detected noise is less that a threshold value.

For instance, when the purpose of visit is "REGULAR VISIT", a daily report is often written after the visit, thus a work site closest to a visit destination tends to be used as a highly convenient work site. In this case, when presenting work sites with the purpose of visit of "REGULAR VISIT", the work site candidate presentation unit 114 presents a work site closest to the visit destination as a priority among the candidates for work site acquired from the work site management server 200.

For instance, the work site candidate presentation unit 114 may present candidates for work site as the use history information of work sites based on the use history information of users who utilize the work sites.

Specifically, for instance, when one user reserves and uses a work site, the work site candidate presentation unit 114 may present candidates for work site to be used by the one user, based on the use history information of other users different from the one user. In this case, for instance, of the candidates for work site acquired from the work site management server 200, work sites with a high frequency of use by other users are presented as a priority. In other words, for instance, of the candidates for work site acquired from the work site management server 200, the candidates for work site most frequently used by other users are presented as a priority.

For instance, when one user reserves and uses a work site, the work site candidate presentation unit 114 may present candidates for work site to be used by the one user, based on the use history information of the one user. In this case, for instance, of the candidates for work site acquired from the work site management server 200, work sites with a high frequency of use by the one user are presented as a priority. In other words, for instance, even when a work site has a high frequency of use by other users, if the work site has a low frequency of use by the one user, the work site is not presented as a priority. As an additional remark, for instance, favorite work sites of the one user are presented as a priority.

In addition, for instance, the work site candidate presentation unit 114 may present candidates for work site as the use history information of work sites based on the visit destinations when work sites are used.

Specifically, for instance, when the visit destination is A company, the work site candidate presentation unit 114 presents work sites as a priority out of the candidates for work site acquired from the work site management server 200, the work sites having a high frequency of use when A company is visited.

It is to be noted that information other than the purpose of visit, the use history information, and the information on the visit destinations may be used as the use history information. For instance, candidates for work site may be presented using the use history information such as the date/time of customer visit, and the number of attendances at customer visit.

Alternatively, the above-described processing may be performed by the work site retrieval unit 212 of the work site management server 200. For instance, the work site retrieval unit 212 may acquire the use history information stored in the use history information storage 117 from the customer management server 100, and may retrieve candidates for work site based on the acquired use history information.

(Processing Performed when Visit Destination is Changed)

After a user reserves a work site, the user may change information on customer visit, such as the visit destination or the date/time of visit. In this case, according to the change of the information on customer visit, candidates for work site may be presented, which have contents different from those of the candidates for work site already presented to a user.

Specifically, for instance, when the information on customer visit is changed, the work site retrieval unit 212 acquires the changed information from the customer management server 100. The work site retrieval unit 212 retrieves candidates for work site based on the acquired information, and outputs information on the candidates for work site found by the retrieval to the customer management server 100. The work site candidate presentation unit 114 of the customer management server 100 then outputs to the user terminal 300 the information on candidates for work site received from the work site retrieval unit 212, and presents the information to a user. As a consequence, candidates are presented, which are different from the candidates for work site already presented to a user before the information on customer visit is changed.

(Other Modifications)

In the exemplary embodiment, part or all of the processing of the customer management server 100 may be implemented by the work site management server 200, or part or all of the processing of the work site management server 200 may be implemented by the customer management server 100. For instance, the functions of the work site candidate presentation unit 114, and the work site selection reception unit 115 may be implemented by the work site management server 200 which may present candidates for work site to a user, or may receive selection of a work site to be reserved from a user.

As an additional remark, in the exemplary embodiment, the configuration including the customer management server 100 and the work site management server 200 may be used as an example of the information processing system, the customer management server 100 may be used as an example of the information processing system, or the work site management server 200 may be used as an example of the information processing system. More particularly described, for instance, the functions of the identification unit and the presentation unit may be implemented by the work site management server 200. Alternatively, for instance, part of the function of the identification unit may be implemented by the customer management server 100, and the remaining function of the identification unit may be implemented by the work site management server 200. Similarly, for instance, part of the function of the presentation unit may be implemented by the customer management server 100, and the remaining function of the presentation unit may be implemented by the work site management server 200.

The program that implements the exemplary embodiment of the disclosure may be provided by a communication unit, or may be stored in a recording medium such as a CD-ROM, and provided.

Although the exemplary embodiment and various modifications have been described above, the exemplary embodiment and modifications may be combined to implement a configuration.

In addition, the present disclosure is not limited to the exemplary embodiment described above, and may be implemented in various forms without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   an identification unit that identifies a condition for use of a work site according to a purpose of visit of a visitor; and
   a presentation unit that presents candidates for the work site which satisfy the condition for use identified by the identification unit,
   wherein the identification unit identifies a condition as the condition for use, the condition being for pre-visit use or post-visit use of the work site and defined according to the purpose.

2. The information processing system according to claim 1, wherein the identification unit identifies a condition for work time as the condition for use, the condition being defined according to the purpose.

3. The information processing system according to claim 2, wherein when the visitor visits a plurality of visit destinations, the presentation unit presents the candidates for the work site based on the condition for work time corresponding to each of a plurality of visits, and dates and times of visit for the plurality of visit destinations.

4. The information processing system according to claim 1, wherein the identification unit identifies a condition as the condition for use, the condition being related to confidentiality of the work site and defined according to the purpose.

5. The information processing system according to claim 4, wherein the confidentiality of the work site is determined based on a configuration of work space at the work site.

6. The information processing system according to claim 1, wherein when the visitor visits a plurality of visit destinations, the presentation unit presents the candidates for the work site based on the condition for the pre-visit use or post-visit use corresponding to each of a plurality of visits, and dates and times of visit for the plurality of visit destinations.

7. The information processing system according to claim 1, wherein the identification unit identifies a condition as the condition for use, the condition being for necessity or unnecessity of use of the work site and defined according to the purpose.

8. The information processing system according to claim 1, further comprising
   a storage that stores use history information that indicates a use history of the work site which is used when a visit destination is visited,
   wherein the presentation unit presents the candidates for the work site using the use history information.

9. The information processing system according to claim 8, wherein the presentation unit presents the candidates for the work site to be used by a visitor, based on the use history information of the visitor.

10. The information processing system according to claim 8, wherein the presentation unit presents the candidates for the work site to be used by a visitor, based on the use history information of another visitor different from the visitor.

11. The information processing system according to claim 1, wherein the presentation unit presents candidates for the work site differently from contents of the candidates for the work site already presented.

12. A non-transitory computer readable medium storing a program causing a computer to execute a process comprising:
    identifying a condition for use of a work site according to a purpose of visit of a visitor;
    identifying a condition as the condition for use, the condition being for pre-visit use or post-visit use of the work site and defined according to the purpose; and
    presenting candidates for the work site which satisfy the condition for use identified by the identification unit.

* * * * *